United States Patent [19]

Steger et al.

[11] Patent Number: 5,468,288
[45] Date of Patent: Nov. 21, 1995

[54] MASTICATING AGENT FOR RUBBER

[75] Inventors: Lothar Steger, Müchen; Horst Syrowatka, Brühl, both of Germany; Walter Schütte, New Town, Pa.

[73] Assignee: Rhein Chemie Rheinau GmbH, Mannheim, Germany

[21] Appl. No.: 387,374

[22] Filed: Feb. 13, 1995

Related U.S. Application Data

[63] Continuation of Ser. No. 163,738, Dec. 6, 1993, abandoned.

[30] Foreign Application Priority Data

Dec. 16, 1992 [DE] Germany ............... 42 42 499.2

[51] Int. Cl.$^6$ .................. C09D 191/00; C08C 4/00; C08L 91/00
[52] U.S. Cl. .................................................. 106/243
[58] Field of Search ................................. 106/243

[56] References Cited

U.S. PATENT DOCUMENTS 3,759,947  9/1973  Pugin et al. ...................... 106/243
3,839,250  10/1974  Ehrend et al. ..................... 260/23 R

FOREIGN PATENT DOCUMENTS 2177909  11/1973  France.
  86496  10/1972  German Dem. Rep..
2214810   9/1973  Germany.

OTHER PUBLICATIONS

Orbit Abstract of DD–A 86496 (Oct. 1972).
CA80(6):28194s, "Plasticizer for natural and/or Synthetic Rubber", Ehrand et al. (1972).
Healey, The *Condensed Chemical Dictionary*, Jan Nostrand Reinhold, N.Y., Feb. 1974, p. 279.
Harwood and Geyer, *Biology Data Book*, Federation of American Sacroties for Experimental Biology, Wash. D.C., 1964.

*Primary Examiner*—David Brunsman
*Attorney, Agent, or Firm*—Connolly & Hutz

[57] ABSTRACT

A masticating agent for rubber consists of tallow fatty acid with an addition of 0.1 to 3% by weight (based on the masticating agent) of a 16-membered, metal-containing ring compound.

10 Claims, No Drawings

MASTICATING AGENT FOR RUBBER

This application is a continuation of application Ser. No. 08/163,738 filed on Dec. 6, 1993, which is now abandoned.

The natural rubber supplied from the plantations is generally too hard and sinewy to enable it to be mixed directly with rubber chemicals and then processed. The same applies to hard types of synthetic rubbers, e.g. copolymers of butadiene and styrene or acrylic acid nitrile and other rubber-like copolymers. It is therefore necessary to masticate the rubber before the mixing process, i.e. to render it plastic. Mastication may be a purely mechanical process without the addition of chemical auxiliary agents by treating the rubber on rollers or in kneaders. This process, which must be carried out at a low temperature, is generally rather time consuming. Masticating agents are therefore generally added for better utilization of the working capacity available in the factory and for saving energy, and the rubber is masticated at elevated temperatures.

Very rapid and uniform breakdown of the rubber is thereby obtained.

Conventional masticating agents are inter alia thiophenols which may carry various different substituents on the acrylic group, and their disulphides and zinc salts. Nitroso compounds and hydrazine derivatives have also been used as plasticizing agents. It is known that although these compounds are highly effective in small doses, it is important not to use less than certain minimum concentrations of the plasticizing agent.

It is known from DE-AS 1 220 123 that 16-membered cyclic ring compounds containing metal, in which 8 carbon atoms and 8 nitrogen atoms are arranged alternately and in which every second nitrogen atom forms a heterocyclic ring with the two adjacent carbon atoms via an optionally substituted bridging members consisting of two atoms and in which at least a part of the heterocyclic rings contains two adjacent nitrogen atoms are particularly suitable masticating agents for natural and synthetic rubbers. These compounds will hereinafter be referred to as "Ferron".

They are suitably used for mastication in quantities of from 0.00001 to 0 1%, based on the rubber, at temperatures of from 80° to 180° C., preferably at 125° to 130° C.

The compounds to be used according to the invention may be expressed by the following formulae I and II in which Me denotes an at least divalent metal atom and R stands for alkyl, aryl or cycloalkyl groups which may pairwise form optionally substituted carbocyclic or heterocyclic rings.

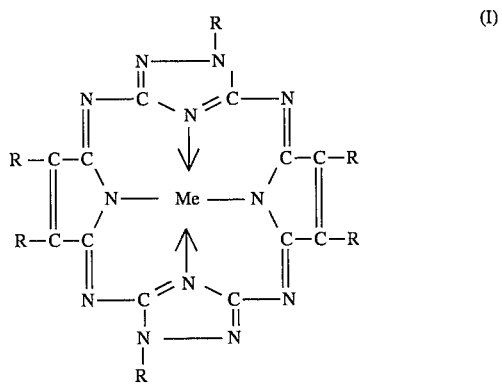

(I)

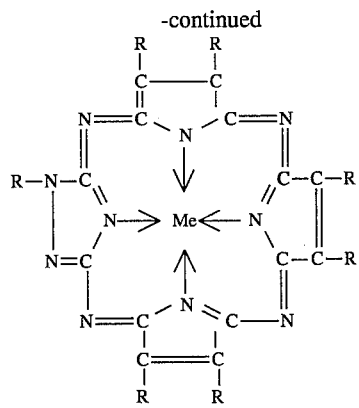

(II)

These compounds may be, for example, tetra-azaporphines or hemiporphyrazines. The compounds contain metals such as iron, cobalt, nickel, chromium, manganese, zinc, aluminium or magnesium bound in complex formation. The compounds are obtained from optionally substituted aminopyrrolenines with guanazole [3,5-diamino-triazole-(1,2,4)] or substituted guanazoles and metal salts (see German Patent Specification 1 080 243 and U.S. patent specification 2,765,308).

Some of these compounds have such an intense colour that the rubber mixture becomes noticeably and permanently coloured even when the compounds are added in the small quantities required for mastication. This effect is more noticeable in light coloured crepe and less so in smoked sheets. Others of these compounds, in particular the hemiporphyrazines, produce virtually no colour in the rubber. It is therefore important to keep the concentrations of masticating agents as low as possible and at the same time to add a suitable other plasticizing agent, e.g. zinc pentachlorothiophenol or pentachlorothiophenol. This mixture produces the same effect as a higher concentration of the metal complex alone but the discolouration of the rubber can in that case be virtually neglected. The quantity of conventional plasticizing agents required in this process is substantially less than that required in the absence of the metal complex.

For producing rubber mixtures, i.e. mixtures of masticated rubber containing all the chemicals required for processing and vulcanization, such as fillers, stabilizers, vulcanizing agents and vulcanization accelerators, it was hitherto necessary to carry out three steps:

1. Mastication, e.g. as described above,
2. Premixing, i.e. incorporation of the rubber chemicals and fillers,
3. Final mixing, i.e. addition of the vulcanizing agent.

The three steps must be carried out separately because the action of the masticating agent is otherwise impaired by the rubber chemicals and their distribution is prevented and because premature addition of the vulcanizing agent is liable to release unwanted vulcanization.

There is therefore a demand for a masticating agent which is simpler to use. Such a masticating agent for rubber consists of tallow fatty acid with an addition of from 0.1 to 3% by weight (based on masticating agent) of a 16-membered, metal-containing ring compound of the Formula I or II, from 10 to 20% by weight of zinc oxide and optionally from 0.01 to 1% by weight of a stabilizer.

Tallow fatty acids for the purpose of this invention are mixtures of unsaturated and saturated monocarboxylic acids having 12 to 18 carbon atoms and an iodine number of from 30 to 60 (see Römpp Chemie-Lexikon).

Particularly preferred 16-membered ring compounds are those corresponding to Formulae I and II:

Compound A

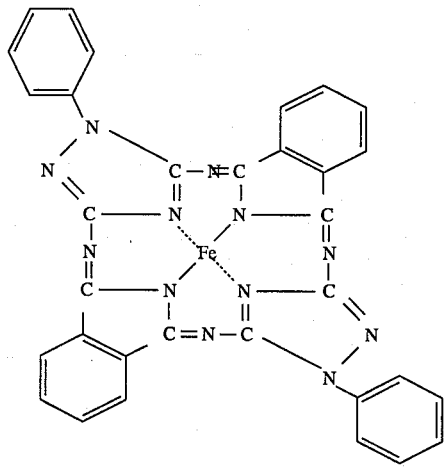

Compound B

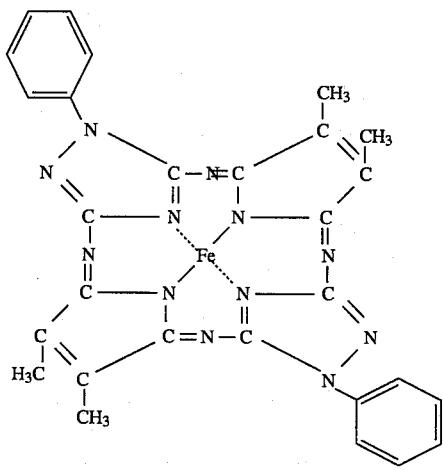

Compound C

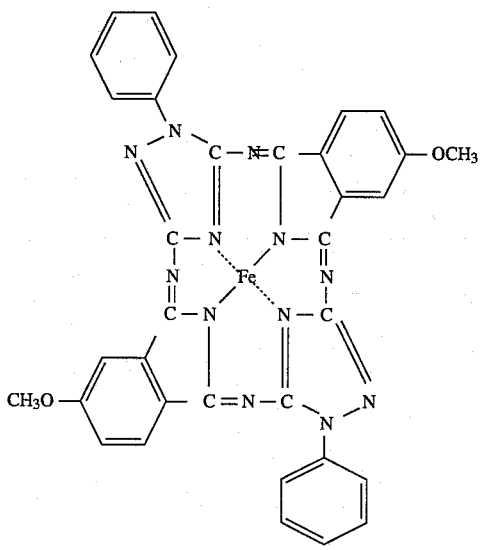

Compound D

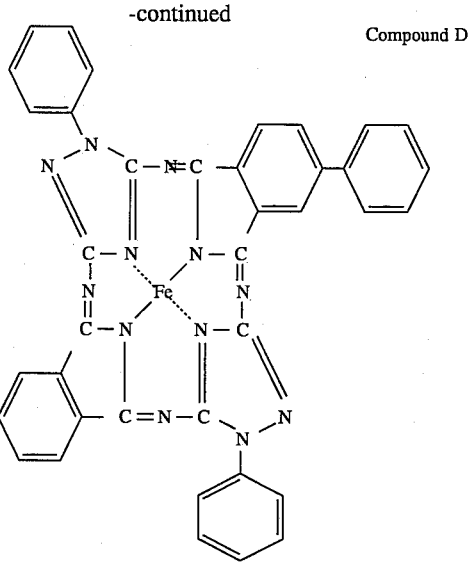

Stabilizers for the purpose of this invention are mono- or oligo-functional substituted phenols which protect the product against damaging external influences. The stabilizer BHT is particularly preferred, i.e. 2,6-di-tert.-butyl-4-methylphenol.

The masticating agents according to the invention can be obtained very simply from their constituents by melting these together, leaving the mixture to get cold and size reducing. They may be incorporated in a single operating step together with the rubber chemicals and fillers and not only masticate the rubber but at the same time effect exceptionally good and intensive distribution of these additives. The vulcanizing agents proper must be added subsequently.

EXAMPLE 1

Starting materials:

150.0 g of tallow fatty acid (composition of the fatty acids:
C 16=45%
C 18'=38%
C 18"=8%
C 18=5%
C 14=2%
C 12=1%

1.5 g of ferron of formula A 22.0 g of zinc oxide 0.5 g of stabilizer BHT (2,6-di-tert.-butyl-4-methyl phenol)

Method:

150 g of the tallow fatty acid are melted and 1.5 g of ferron of formula A are added with stirring. The mixture is heated to 130° C. and stirred at this temperature for 1 hour. 22 g of zinc oxide are then added within 30 minutes and the reaction mixture is saponified at 130° to 135° C. for 1.5 hours. 0.5 g of stabilizer BHT is then added and stirring is continued for 15 minutes. The product is then poured out on to a metal sheet and broken up when cold.

Product data:

| | |
|---|---|
| Melting range (°C.) | 99–104 |
| Ash (%) | 13.0 |
| Fe content (%) | 0.037 |
| Iodine number | 44.2 |

What is claimed is:

1. A masticating agent for rubber which consists essentially of 76 to 89.9% by weight of tallow fatty acid with an addition of 0.1 to 3% by weight, based on the masticating agent, of a 16-membered, metal-containing ring compound corresponding to Formula I or Formula II:

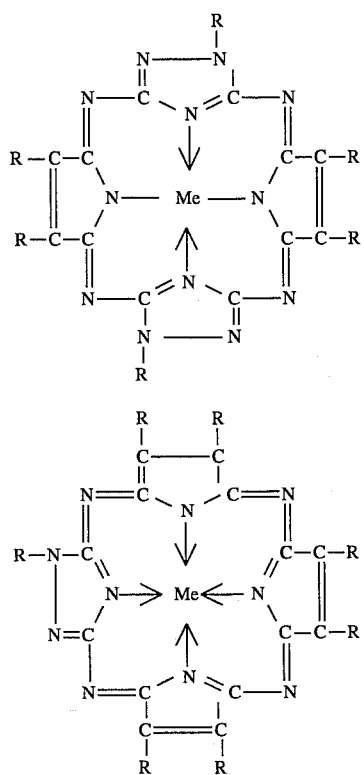

in which Me stands for an at least divalent metal atom and R stands for alkyl, aryl or cycloalkyl groups which may also pairwise form carbocyclic or heterocyclic rings and from 10 to 20% by weight of zinc oxide.

2. A masticating agent for rubber which consists essentially of 76 to 89.89% by weight of tallow fatty acid with an addition of 0.1 to 3% by weight, based on the masticating agent, of a 16-membered, metal-containing ring compound corresponding to Formula I or Formula II.

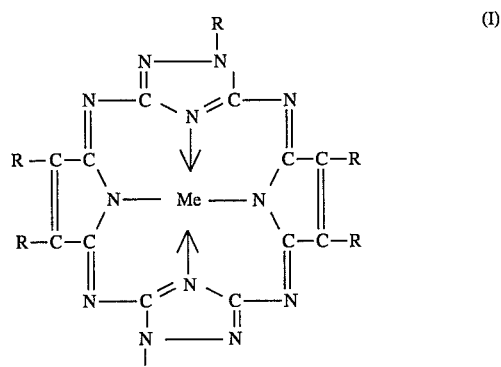

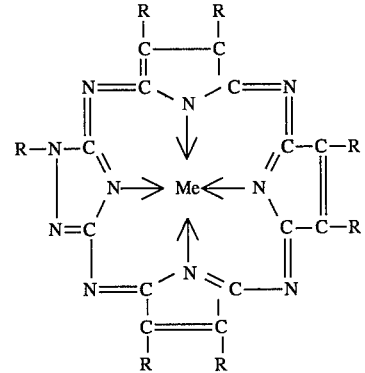

in which Me stands for an at least divalent metal atom and R stands for alkyl, aryl or cycloalkyl groups which may also pairwise form carbocyclic or heterocyclic rings, from 10 to 20% by weight of zinc oxide and from 0.01 to 1% by weight of a stabilizer.

3. The masticating agent of claim 2, wherein said stabilizer is at least one mono- or oligo-functional substituted phenol.

4. The masticating agent of claim 3, wherein said stabilizer is 2,6-di-tert-butyl-4-methylphenol.

5. The masticating agent of claim 1, wherein said tallow fatty acid consists essentially of mixtures of unsaturated and saturated monocarboxylic acids having from 12 to 18 carbon atoms and an iodine number of from 30 to 60.

6. The masticating agent of claim 1, wherein Me is selected from the group consisting of iron, cobalt, nickel, chromium, manganese, zinc, aluminum or magnesium.

7. The masticating agent of claim 1, wherein said 16-membered, metal-containing ring compound is:

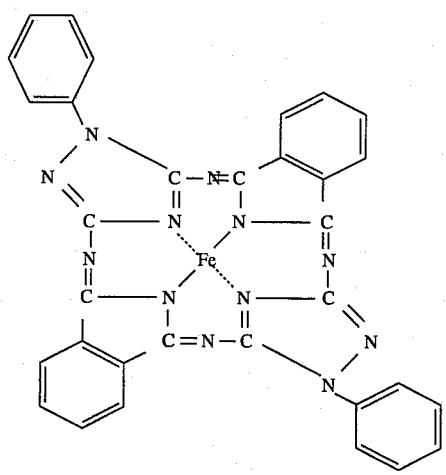
8. The masticating agent of claim 1, wherein said 16-membered, metal-containing ring compound is:
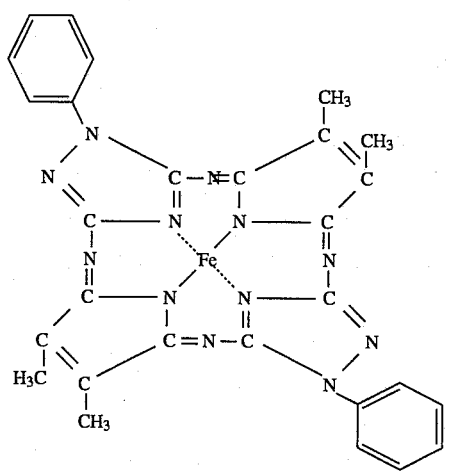
9. The masticating agent of claim 1, wherein said 16-membered, metal-containing ring compound is:
10. The masticating agent of claim 1, wherein said 16-membered, metal-containing ring compound is:
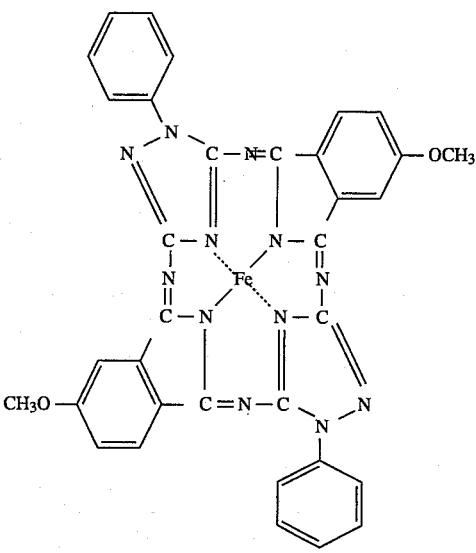
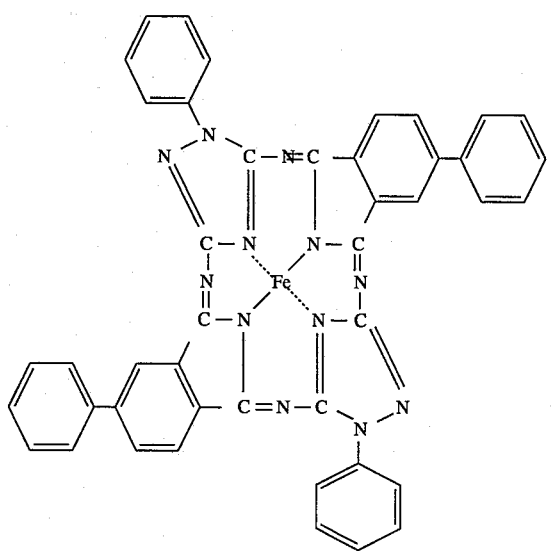
* * * * *

UNITED STATES PATENT AND TRADEMARK OFFICE
CERTIFICATE OF CORRECTION

PATENT NO. : 5,468,288
DATED : November 21, 1995
INVENTOR(S) : Steger et al.

It is certified that error appears in the above-indentified patent and that said Letters Patent is hereby corrected as shown below:

On title page,
Item [56],

In the "References Cited" section on the cover page of the patent, in the FOREIGN PATENT DOCUMENTS subsection, the following document should be inserted.

--1220123   8/1957   Germany--

In the "References Cited" section, in the OTHER PUBLICATIONS subsection, "Healey" should be --Hawley--; and "Sacroties" should be --Societies--. Also in the "References Cited" section, in the OTHER PUBLICATIONS subsection, the following document should be inserted.

--Orbit Abstract of DE-AS 1220123 (Aug. 1957)--

In Column 5, line 11 (Claim 1), change "tallow fatty acid" to --the mixture of fatty acids found in tallow--.

In Column 5, line 51, (Claim 2), change "tallow fatty acid" to --the mixture of fatty acids found in tallow--.

In Column 6, lines 44-45 (Claim 5), change "tallow fatty acid" to --mixture of fatty acids--.

UNITED STATES PATENT AND TRADEMARK OFFICE
CERTIFICATE OF CORRECTION

PATENT NO. : 5,468,288
DATED : November 21, 1995
INVENTOR(S) : Steger et al.

Page 2 of 3

It is certified that error appears in the above-indentified patent and that said Letters Patent is hereby corrected as shown below:

In Column 2, lines 1-16, and Column 5, lines 31-45, the Formula (II)

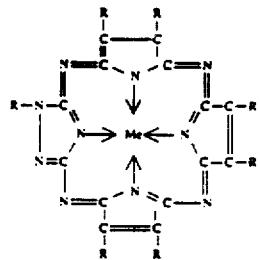

should read

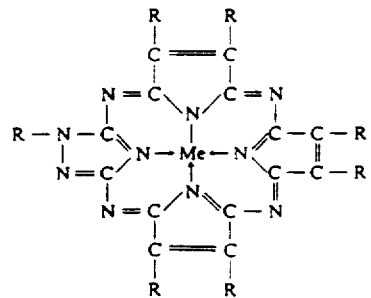

In Column 6, lines 20-33, the Formula (II)

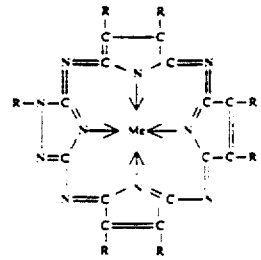

UNITED STATES PATENT AND TRADEMARK OFFICE
CERTIFICATE OF CORRECTION

PATENT NO. : 5,468,288
DATED : November 21, 1995
INVENTOR(S) : Steger et al.

It is certified that error appears in the above-indentified patent and that said Letters Patent is hereby corrected as shown below:

should read

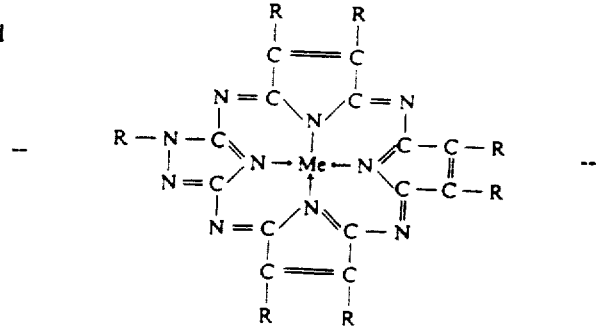

Signed and Sealed this

Fifth Day of November, 1996

Attest:

BRUCE LEHMAN

Attesting Officer

Commissioner of Patents and Trademarks